United States Patent
Shah et al.

(10) Patent No.: US 9,984,255 B2
(45) Date of Patent: May 29, 2018

(54) METHODS AND APPARATUS TO ENABLE RUNTIME CHECKSUM VERIFICATION OF BLOCK DEVICE IMAGES

(71) Applicant: Samsung Electronics Co., Ltd., Suwon-si, Gyeonggi-do (KR)

(72) Inventors: Jitesh Shah, Mountain View, CA (US); Song Wei, Johns Creek, GA (US); Ahmed Azab, Palo Alto, CA (US); Xun Chen, San Jose, CA (US); Peng Ning, Saratoga, CA (US); Wenbo Shen, Richardson, TX (US); Michael Grace, Santa Clara, CA (US)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days. days.

(21) Appl. No.: 14/683,658

(22) Filed: Apr. 10, 2015

(65) Prior Publication Data
US 2016/0092701 A1    Mar. 31, 2016

Related U.S. Application Data (60) Provisional application No. 62/057,778, filed on Sep. 30, 2014.

(51) Int. Cl.
*G06F 21/64* (2013.01)
*G06F 21/74* (2013.01)
*H04L 9/32* (2006.01)
*H04L 29/06* (2006.01)
*H04W 4/00* (2018.01)

(52) U.S. Cl.
CPC .............. *G06F 21/64* (2013.01); *G06F 21/74* (2013.01); *H04L 9/3247* (2013.01); *H04L 9/3263* (2013.01); *H04L 63/0823* (2013.01); *H04W 4/003* (2013.01); *G06F 2221/2101* (2013.01)

(58) Field of Classification Search
CPC . H04L 9/0643; H04L 9/3223; H04L 63/0823; H04L 9/3236; H04L 9/3247; H04L 9/3263; G06F 21/64; G06F 21/74
See application file for complete search history.

(56) References Cited

U.S. PATENT DOCUMENTS

| | | | |
|---|---|---|---|
| 6,970,902 B1 * | 11/2005 | Moon | H04L 45/56 709/201 |
| 8,776,056 B2 * | 7/2014 | Sasaki | G06F 8/65 717/174 |
| 9,235,709 B2 * | 1/2016 | Kim | G06F 21/575 |

(Continued)

OTHER PUBLICATIONS

Goodrich et al. "Authenticated Dictionaries for Fresh Attribute Credentials" Mar. 2003, pp. 1-16, http://cs.brown.edu/cgc/stms/papers/itrust2003.pdf.*

(Continued)

*Primary Examiner* — Theodore C Parsons
*Assistant Examiner* — Carlos M De Jesus Lassala (57) ABSTRACT

A method for verifying data integrity of a block device is provided. The method includes providing a secure world execution environment configured to monitor changes to data blocks of a block device, within the secure world execution environment, generating a hash for changed data blocks of the block device, and within the secure world execution environment, verifying and generating a cryptographic signature.

24 Claims, 8 Drawing Sheets

(56) References Cited

U.S. PATENT DOCUMENTS

| | | | | |
|---|---|---|---|---|
| 2004/0103299 A1* | 5/2004 | Zimmer | ............ | G06F 21/57 |
| | | | | 726/26 |
| 2013/0091353 A1* | 4/2013 | Zhang | ............ | H04L 9/3268 |
| | | | | 713/156 |
| 2014/0325644 A1* | 10/2014 | Oberg | ............ | G06F 21/51 |
| | | | | 726/22 |
| 2015/0271208 A1* | 9/2015 | Gallant | ............ | H04L 63/20 |
| | | | | 726/1 |

OTHER PUBLICATIONS

Extended European Search Report dated Aug. 25, 2016 in connection with European Application No. 16164533.8, 6 pages.
Communication pursuant to Article 94(3) EPC dated Aug. 31, 2017 in connection with European Patent Application No. 16 164 533.8.

* cited by examiner

METHODS AND APPARATUS TO ENABLE RUNTIME CHECKSUM VERIFICATION OF BLOCK DEVICE IMAGES

CROSS-REFERENCE TO RELATED APPLICATION(S) AND CLAIM OF PRIORITY

The present application claims priority to U.S. Provisional Patent Application Ser. No. 62/057,778 filed Sep. 30, 2014 entitled "METHODS AND APPARATUS TO ENABLE RUNTIME CHECKSUM VERIFICATION OF BLOCK DEVICE IMAGES". The content of the above-identified patent document is incorporated herein by reference.

TECHNICAL FIELD

The present application relates generally to electronic devices requiring data integrity protection and, more specifically, to verifying the data integrity of block devices of mobile devices requiring run-time file-based update.

BACKGROUND

Most electronic devices utilize a physical data storage hardware, such as a hard drive (also commonly known as "hard disk") and/or a Multi-media card (MMC), and a multilayered software architecture to manage how data is stored and retrieved. In this multilayered software architecture, In many cases, data stored in an electronic device is of high importance, and needs protection against malicious or unverifiable modifications, which is known as data integrity protection. For example, telecommunication handsets have embedded MMCs housing operating system related data that is the frequent target of malicious alternations aim1ng to hijack the control of a device or to steal sensitive information. On the other hand, a valid update or change to the data stored on a device is often needed. For example, the manufacturer frequently releases Over-The-Air (OTA) software updates to the telecommunications handsets to fix bugs or upgrade software system features. Therefore, data integrity protection is also required to accommodate the run-time update to the data on devices.

One common approach of data integrity protection is to verify the data on the layer of block device. Block device, an abstract layer in the above-mentioned multilayered software architecture, manipulates data in fixed-size blocks, and controls the data transfer between the layer of file system and the layer of actual physical hardware. Data stored on a block device can be verified by applying a cryptographic hash function to the current contents of the block device as a whole to obtain a hash checksum and comparing this hash checksum against a precomputed known good checksum value. The known good checksum value is the result of applying the same hash function to the known good contents of a block device. Some methods of calculating the checksum utilize calculation of a cryptographic hash tree. The root of the hash tree, also called "root hash", is the calculated checksum used to check against the known good checksum value. When the calculated checksum matches the known good checksum, the block device contents are considered verified, i.e., the contents are known good. When an authenticated change is applied to a verified block device, new known good checksum has to be provided, and thereafter, the device can be verified by comparing the calculated hash checksum to the new known good hash checksum. It should be pointed out that the hash checksum calculation is sensitive to not only the contents stored in each data block but also the distribution order of data blocks on a block device such that even if a block device includes the same set of data blocks as a the verified or known good block device. Consequently, to maintain the feasibility of utilizing the pre-computed known-good hash checksum for data integrity verification after update, the update to the block devices to be applied in a deterministic block-by-block manner, i.e., the change to each data block and the distribution of data blocks after update are pre-determined, from which a new known good hash checksum is pre-computed. Such an update method is known as block-based update. However, many manufacturers use the file-based update method in which the update is applied by removing, adding, and/or overwriting files in the layer of file system, and the actual changes to the underlying block device layer are non-deterministic, i.e., the change to each data block and the distribution of data blocks after update are unknown now. That is, the pre-computed known good checksum value can no longer be used to verify the data on device after a file-based update is applied. As a result, the above-described methodology cannot be used to verify the data integrity of devices with run-time file-based update. Accordingly, there is a need for methods of efficiently verifying the data integrity of block devices which can accommodate the file-based update on run time.

SUMMARY

In a first embodiment, a method for setting up a secure world execution environment for run-time file-based update is provided. The method includes providing a secure world execution environment configured to verify all its limited and pre-defined inputs, before the run-time update, such as the block device to be updated and the update to be applied. The method also includes, within the secure world execution environment, verifying and generating a cryptographic signature using a cryptographic key, where both the key and the signature are protected by a certificate chain with a root of trust that cannot be forged.

In a second embodiment, a method for generating the new known good hash checksum of a block device for file-based update is provided. The method includes providing a secure world execution environment configured to monitor changes to data blocks of a block device during the file-based update. The secure world execution environment has verified both the block device to be updated and the update data to be applied before starting the file-based update. The method also includes, within the secure world execution environment, generating a hash for each changed data block of the block device and creating a signature for the generated hash checksum using a cryptographic key, where both the key and the signature is protected by a certificate chain with a root of trust that cannot be forged.

In a third embodiment, a method of verifying the data integrity of a block device in normal world operation is provided. The method includes verifying the cryptographic signature of the hash checksum of the block device which is generated on device during run-time update. The method also includes utilizing a block device data integrity check tool to verify the data after the signature of the hash checksum is verified.

In a fourth embodiment, a user equipment (UE) is provided. The UE includes a secure world execution environment configured to monitor changes to data blocks of a block device of the user equipment. The UE also includes a hash generator configured to operate in the secure world execution environment and further configured to generate a hash associated with the changed data blocks of the block device and to create a cryptographic signature for the hash using a cryptographic key, where both the key and the signature is protected by a certificate chain with a root of trust that cannot be forged.

In a fifth embodiment, a method for verifying data integrity of a block device of a user device is provided. The method includes receiving and verifying a file-based update package within a secure world execution environment in which the block device to be updated requires to be verified. The method also includes applying the file-based update package to the block device and monitoring each changed data block as a result of the update. The method further includes generating a hash tree associated with the updated data blocks of the block device, and creating a cryptographic signature for the root hash using a cryptographic key, where both the key and the signature is protected by a certificate chain with a root of trust that cannot be forged.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of the present invention in this patent document are by way of illustration only and should not be construed in any way to limit the scope of the disclosure. Those skilled in the art will understand that the principles of this disclosure can be implemented in any suitably arranged device or system.

Figure 1:
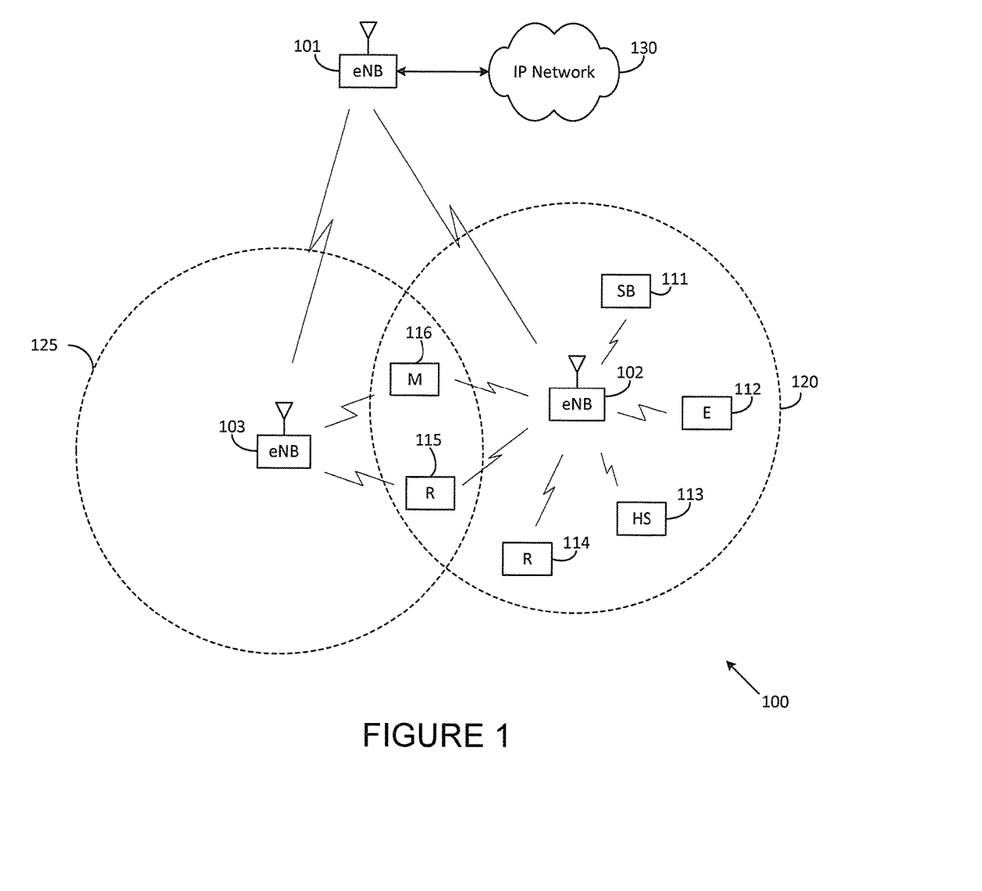
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, at least one UE, such as UE 116, is configured to facilitate verification of block devices on an updated secure partition of the UE. Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
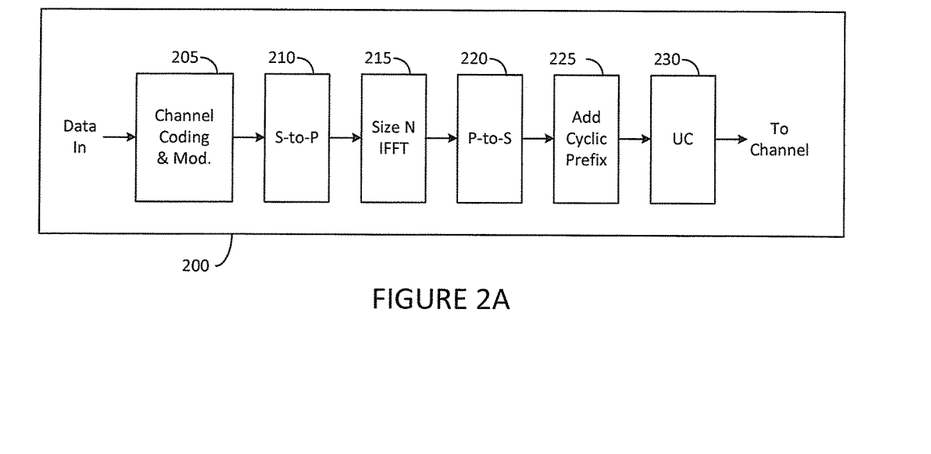
FIGS. 2A and 2B illustrate example wireless transmit and receive paths according to this disclosure.
Figure 2B:
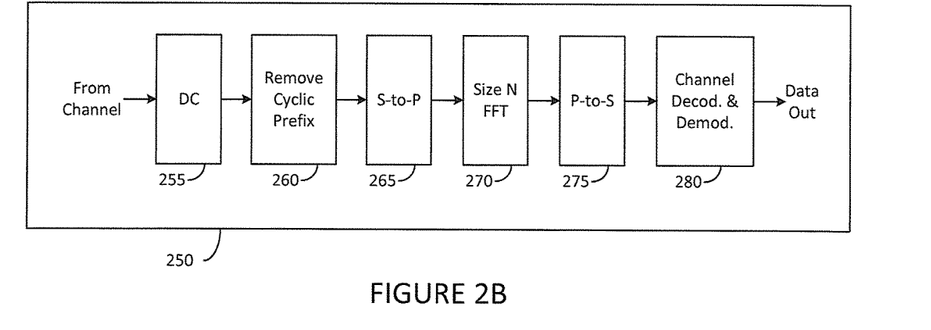

FIGS. 2A and 2B illustrate example wireless transmit and receive paths according to this disclosure. In the following description, a transmit path 200 can be described as being implemented in an eNB (such as eNB 102), while a receive path 250 can be described as being implemented in a UE (such as UE 116). However, it will be understood that the receive path 250 could be implemented in an eNB and that the transmit path 200 could be implemented in a UE. In some embodiments, processing circuitry within, or coupled to, the transmit path 200 and receive path 250 are configured to facilitate verification of block devices on an updated secure partition of a UE.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal can also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to eNBs 101-103 and can implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architecture could be used to support wireless communications in a wireless network.

Figure 3:
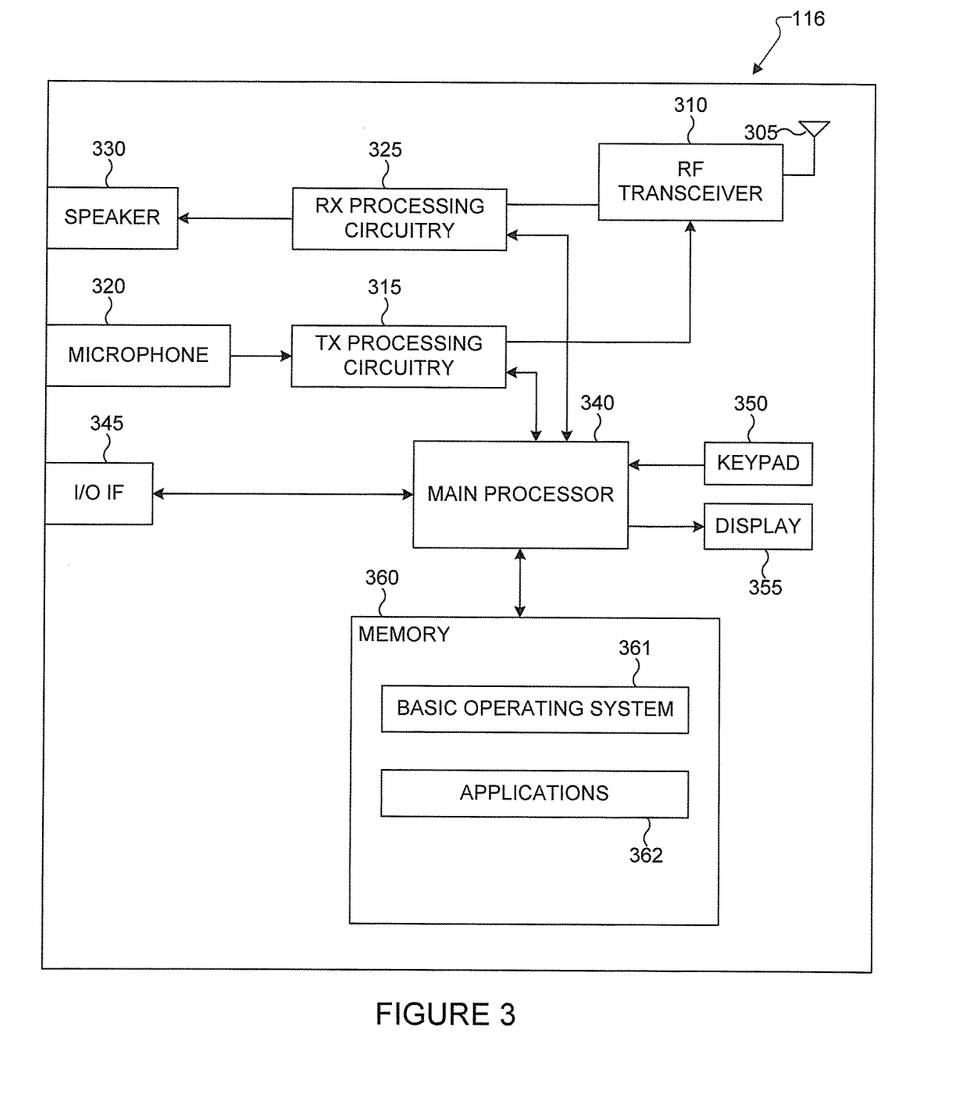
FIG. 3 illustrates an example user equipment according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360.

The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for facilitating verification of block devices on an updated secure partition of a UE. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 can be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes can be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
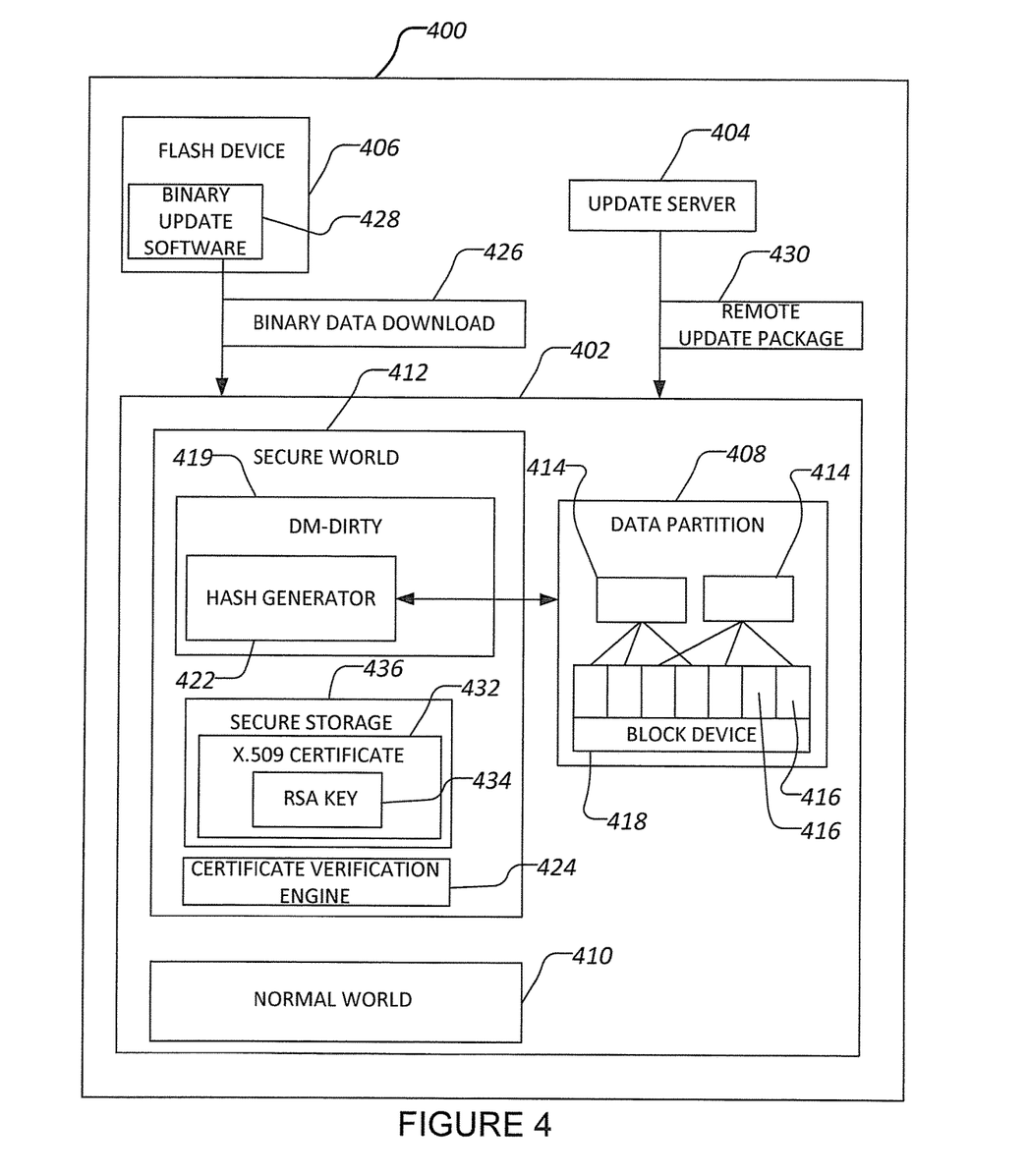
FIG. 4 illustrates an example verification system according to this disclosure.

FIG. 4 illustrates an example verification system 400 for file-based update according to this disclosure. The embodiment of the verification system 400 illustrated in FIG. 4 is for illustration only. Other embodiments could be used without departing from the scope of the present disclosure.

The verification system 400 includes verification processing circuitry (VPC) 402, a flash device 406, and an update server 404. The VPC 402 includes a secure or data partition 408 to be protected, a normal execution environment called a normal world 410, and an isolated execution environment called a secure world 412. The data partition 408 includes system files 414 mapped by a file system to data blocks 416 of a block device 418. The system files 414 are of the type normally desired to be protected from unauthorized updating and/or alteration. For example, in cases where the verification system 400 is integrated with or is a component of an ANDROID operating system based device, such as a mobile operating system (OS) based on the LINUX kernel or similar operating system for a mobile touchscreen device, the system files 414 can be located in the /system partition of the device. The secure world 412 includes a device mapper 419, in this embodiment a device mapper called DM-DIRTY. DM-DIRTY is configured to selectively serve as a layer between a file system and block device 418 of the data partition 408. DM-DIRTY is configured to capture any changes to the block device 418 resulting from a change to files of the data partition, such as files changed due to application of a file-based update. DM-DIRTY interprets any changes in the file system and utilizes information regarding exactly which data blocks 416 are changed on runtime. For each data block 416 being changed, DM-DIRTY is configured to calculate a hash based on the contents of the changed data block and update corresponding leaves of a hash tree of the block device 418. DM-DIRTY is further configured to calculate a hash tree and a root hash of the block device 418. The device mapper 419, DM-DIRTY, includes a hash generator 422. The secure world 412 further includes a certificate verification engine 424. In cases where the verification system 400 is integrated with or is a component of an ANDROID operating system based device, the secure world 412 can be configured to execute the recovery boot mode of the device. In some embodiments, the secure world 412 can be associated with a reduced instruction set computer based device (such as a device implementing ARM TrustZone architecture), can be a Hypervisor, or any other trusted execution environment. The device mapper DM-DIRTY is configured to read the system files 414 of the data partition 408 and is configured to communicate information about the data partition 408 to the hash generator 422. The information about the data partition 408 can include system file 414 information (such as information related to the mapping between system files 414 and data blocks 416), the contents of the data blocks 416, and any other information regarding or carried by the data partition 408. The hash generator 422 is further configured to selectively generate one or more hashes based on the contents of the data partition 408.

In certain embodiments, the system files 414 and their related data blocks 416 are altered in response to a flash update package 426 being applied to the data partition 408. The flash update package 426 can be supplied to the VPC 402 by the flash device 406 running memory flash software such as a binary download software 428. In certain embodiments, the system files 414 and their related data blocks 416 are altered in response to a remote update package 430 that is applied to the data partition 408. The remote update package 430 can be supplied wirelessly to the VPC 402 by the update server 404. The update server 404 can be a device operating in the IP Network 130. In alternative embodiments, an update package may be pushed to the VPC 402 or otherwise delivered to the VPC 402 via any other type of network update delivery device and via any other type of network connection, such as through a personal computer connected to an internet service provider.

A cryptographic security certificate, such as an X.509 certificate 432 that has a cryptographic key, such as an RSA key 434, is stored in a secure storage 436. In certain embodiments, the RSA key 434 is rooted at a known or trusted public certificate, or both, of the issuer of the RSA key 434. The secure storage 436 is configured to only share the contents of the X.509 certificate 432 with the certificate verification engine 424 of the secure world 412. The certificate verification engine 424 is further configured to selectively cryptographically sign a hash generated by the hash generator 422 using the RSA key 434. The VPC 402 can be integrated with, or can be a component of, the memory 360 or one or more other components of the UE 116.

Figure 5:
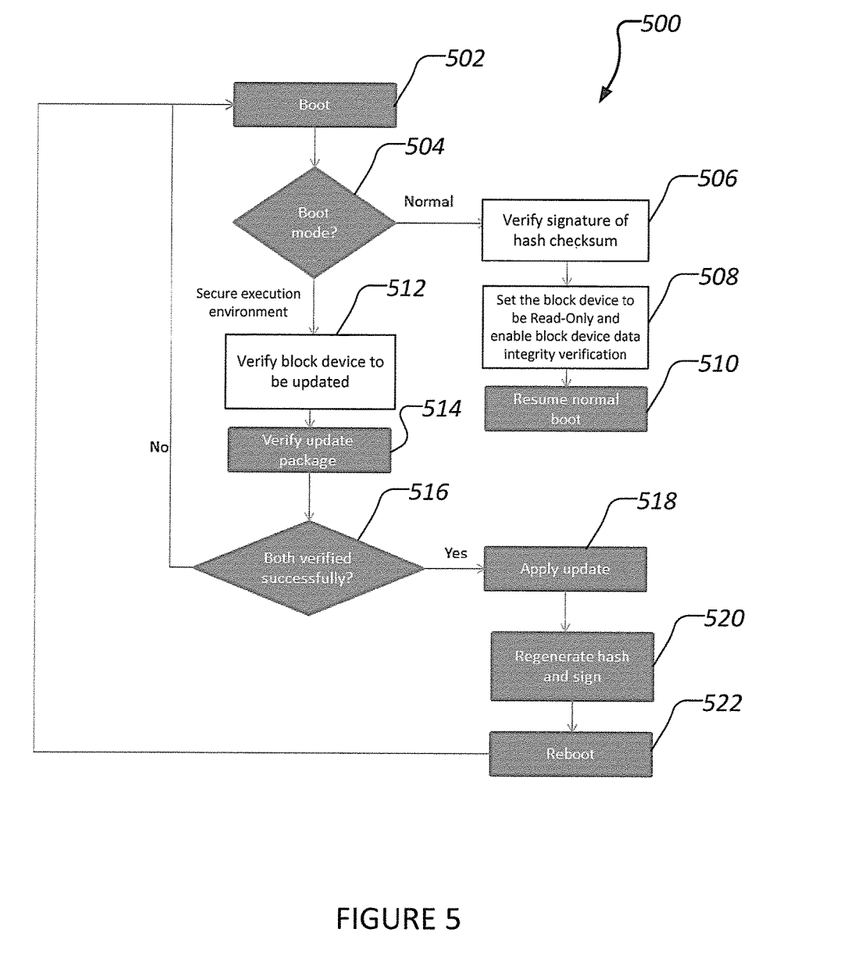
FIG. 5 is a flowchart of an example verification method according to this disclosure.

FIG. 5 illustrates an example verification method 500 according to this disclosure. The embodiment of the verification method 500 illustrated in FIG. 5 is for illustration only. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry, such as a processor or processor array, in, for example, a mobile station.

At step 502, the verification method 500 begins by initiating a boot procedure of a verification device or verification circuitry such as the VPC 402. At step 504 the verification method 500 determines which of a normal boot mode and a secure boot mode has been initiated. When the normal boot mode has been initiated, the verification method 500 progresses to step 506 and verifies the cryptographic signature of the hash checksum of a data partition such as data partition 408. At step 508, the block device to which the data partition 408 is mapped is set to be read-only with data integrity verification functionality turned on. At step 510, the verification method 500 resumes normal boot operation. However, when at step 504 the verification method 500 determines that a secure mode has been initiated, the verification method 500 progresses from step 504 to step 512. At step 512 the data partition is verified. Next, at step 514, an update package such as flash update package 426 or remote update package 430 is verified. At step 516, if one of the partition and the update package are not verified successfully, the verification returns to step 502. At step 516, if both the data partition and the update package are verified successfully, the verification method 500 progresses to step 518. At step 518, the update package is applied to the data partition. At step 520, a hash is generated based on the new data partition content and thereafter signed using a securely provided cryptographic key. After cryptographically signing the hash using the cryptographic key, the verification method initiates a reboot procedure at 522 which returns the verification method 500 to step 502.

Figure 6:
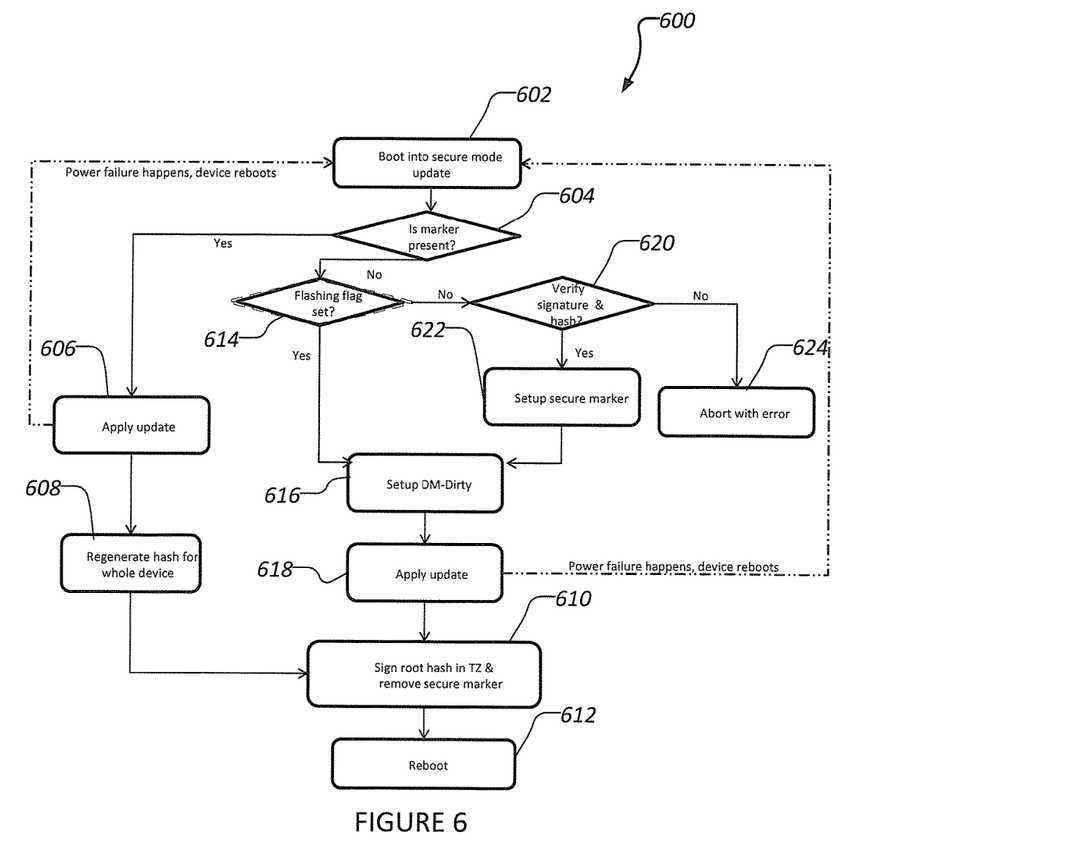
FIG. 6 is a flowchart of another example verification method according to this disclosure.

FIG. 6 illustrates an example verification method 600 according to this disclosure. The embodiment of the verification method 600 illustrated in FIG. 6 is for illustration only. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry, such as a processor or processor array, in, for example, a mobile station.

At step 602, the verification method 600 begins by booting into a secure mode configured to apply an update package. At step 604, the verification method determines whether a secure marker is set or present. Presence of the secure marker indicates that a block device is verified and further provides power failure support for update process. Generation of the secure marker is discussed later with reference with step 622. If the secure marker is set, the verification method progresses to step 606 where the update is applied to a secure or data partition. If a power failure occurs during the file-based update process, the method reboots into the secure mode at step 602. At step 608, the verification method 600 regenerates a hash based on the entire contents of the block device of the data partition. Next, at step 610, the verification method 600 cryptographically signs the generated root hash using a securely stored cryptographic key and removes the secure marker. Next, the verification method 600 progresses to step 612 and initiates a reboot. However, if at step 604 the verification method 600 determines that the secure marker is not set, the verification method 600 proceeds to step 614 and determines whether a special flashing flag has been set. Having a special flashing flag set indicates a block device has previously been verified as being valid and/or secure. If the flashing flag has been set, the verification method 600 proceeds to step 616 and sets up a device mapper, in this case, the above-described device mapper called DM-DIRTY 419. With DM-DIRTY 419 set up, changes to files of a data partition and data blocks of a block device of the data partition will be monitored and utilized by DM-DIRTY to generate hashes of only the updated data blocks (as opposed to the all data blocks), update the leaves of a hash tree of the updated block device, and generate a root hash of the hash tree of the updated block device once the block device has been updated. In some cases, the updated block device may be located on a system partition ("/system") of an ANDROID operating system based device. At step 618, the file-based update is applied to a block device of a secure or data partition. When the application of the update has completed, DM-DIRTY proceeds to generate the root hash of the updated block device as described above. The verification method 600 then proceeds to step 610. However, if at step 614 the verification method 600 determines that the flash related flag has not been set, the verification method 600 proceeds to step 620 and attempts to verify an existing cryptographically signed hash of the contents of a block device that is to be updated. If the verification method 600 verifies the signature and the hash, the verification method 600 proceeds to step 622 and sets up a secure marker, to indicate that the block device is valid and/or verified. In some cases, a secure marker is a securely stored and encrypted file within a security architecture (such as ARM Trustzone). After setting up the secure marker, the verification method 600 proceeds to step 616. However, if at step 620 the verification method 600 fails to verify the signature and the hash, the verification method 600 proceeds to step 624 and aborts the process and indicates an error.

Figure 7:
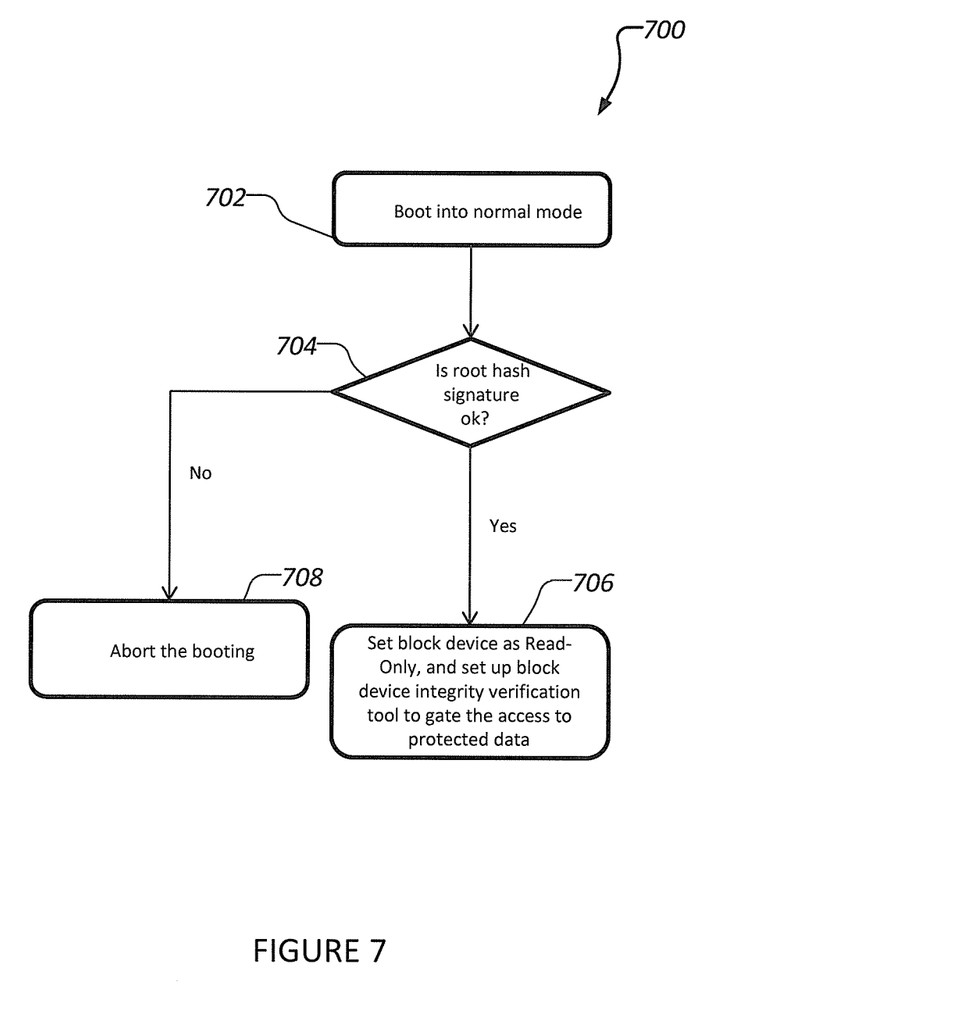
FIG. 7 is a flowchart of still another example verification method according to this disclosure.

FIG. 7 illustrates an example verification method 700 according to this disclosure. The embodiment of the verification method 700 illustrated in FIG. 7 is for illustration only. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry, such as a processor or processor array, in, for example, a mobile station.

At step 702, the verification method 700 begins by booting into a normal mode. In some cases, the verification method 700 can occur after the verification method 600. At step 704, the verification method 700 determines whether the cryptographic signature of the root hash is authenticated. If the signature is authenticated, the verification method 700 progresses to step 706. At step 706, the block device is set to read-only, and the verification method 700 enables a security component configured to require a hash check of the contents of the protected block device before access is granted to the protected data of the block device. In this embodiment, the security component is a block device integrity verification tool, and is configured to compare the calculated root hash against a previously generated cryptographically signed hash value. The verification method 700 at step 706 only allows access to the data of the protected block device of the data partition if the contents of the protected block device are verified by the block device integrity verification tools. If at step 704 the signature of the root hash is not verified, the verification method 700 proceeds to step 708 and aborts the process of booting into the normal mode. In cases where the verification method 700 is integrated with or is a component of an ANDROID operating system based device, the block device integrity verification tool can be configured to execute DM-VERITY designed by Google.

Figure 8:
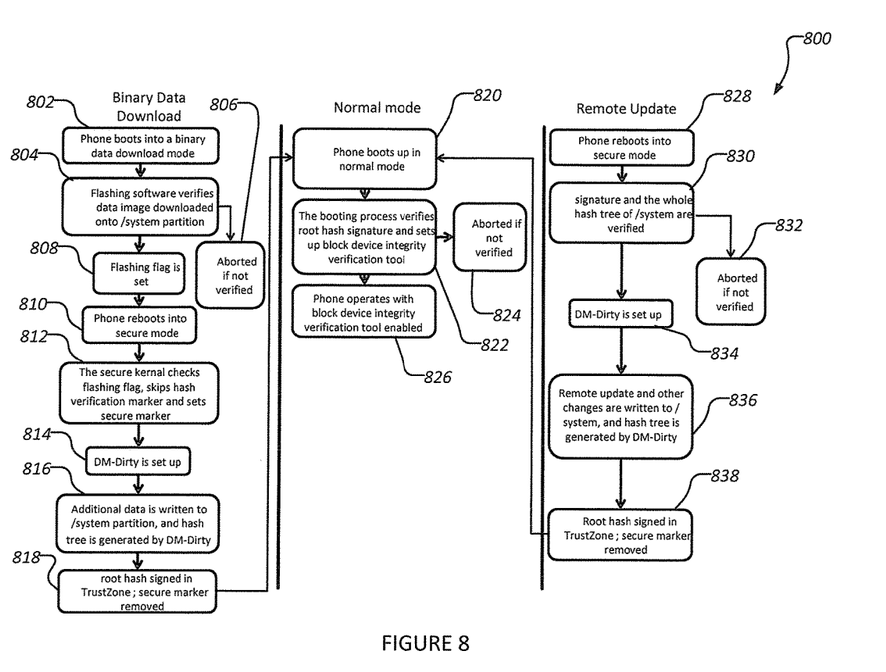
FIG. 8 is a flowchart of yet another example verification method according to this disclosure.

FIG. 8 illustrates an example of applying verification method 800 according to this disclosure. The embodiment of the verification method 800 illustrated in FIG. 8 is for illustration only. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry, such as a processor or processor array, in, for example, a mobile station.

Most generally, verification method 800 provides steps for implementing updates from a flash device, such as a device executing a binary download software 428, and for implementing remote updates from an update server such as update server 404. Steps 802-814 relate specifically to updating from a flash device while steps 826-836 relate specifically to utilizing remote updates.

When the verification method 800 is receiving and/or utilizing a binary data download or flash type update to a UE, namely a phone, the verification method 800 begins at step 802 by booting the phone in a binary data download mode configured to allow communication between the phone and the flash or binary data download software. Next, at step 804, while the phone downloads the flash type update, the update package is verified by the flashing software. If such verification fails, the verification method 800 proceeds to step 806 and the flash based update procedure is aborted. However, if the verification of the update package is successful, the verification method 800 proceeds to step 808. Note that at step 804, the block device being updated does not require data integrity verification as its data will be fully overwritten by the update package. At step 808, a flashing flag is set. Next, at step 810, the phone reboots in to a secure mode. Next, at step 812, the secure mode kernel verifies the flashing flag, the phone skips hash verification marker and sets a secure marker. At step 814, DM-Dirty, a device mapper, is set up. Next at step 816, additional data is written to the system partition and a hash tree is generated by DM-Dirty. At step 818, the root hash is signed in the TrustZone and the secure marker is removed.

With the flash type update applied to the data partition and having signed the new hash associated with the data partition, the verification method 800 proceeds to step 820 and the phone is booted into a normal boot mode. Next at step 822, the initialization process of the normal boot mode verifies the cryptographically signed root hash and sets up a block device integrity verification tool. If the verification method 800 fails to verify the root hash, the verification method 800 proceeds to step 824 and aborts and can implement a failure action. In some cases, the failure action can include rebooting the phone into a panic mode. In other cases, the failure action can be destruction of the data partition. In still other cases, the failure action can be to repeatedly reboot the phone. However, if at step 822 the verification process 800 verifies the signature of the root hash, the verification method 800 progresses to step 826 and the phone works properly with the block device integrity verification tool enabled.

When the verification method 800 is receiving and/or utilizing a remote update to a UE or phone, the verification method 800 begins at step 828 and the phone reboots into a secure mode. Next, at step 830, the secure mode kernel attempts to verify the signature of the remote update, the signature of the root hash, and the data on /system partition against the entire hash tree. If any of such three verifications returns a failure, the verification method 800 progresses to step 832 which produces a failure action. If at step 830 all above-mentioned verifications pass, the verification method 800 progresses to step 834 and sets up DM-Dirty for the update. At step 836, the remote update and other changes are written to the /system partition and a hash tree is regenerated by DM-Dirty. At step 838, a root hash is signed in a TrustZone-based Integrity Measurement Architecture (TIMA) using a securely stored cryptographic key and the secure marker is removed. With the remote update applied to the data partition and having signed the new hash associated with the data partition, the verification method 800 proceeds to step 820.

Although various features have been shown in the figures and described above, various changes may be made to the figures. For example, the size, shape, arrangement, and layout of components shown in FIGS. 1 through 4 are for illustration only. Each component could have any suitable size, shape, and dimensions, and multiple components could have any suitable arrangement and layout. Also, various components in FIGS. 1 through 4 could be combined, further subdivided, or omitted and additional components could be added according to particular needs. Further, each component in a device or system could be implemented using any suitable structure(s) for performing the described function(s). In addition, while FIGS. 5 through 8 illustrate various series of steps, various steps in FIGS. 5 through 8 could overlap, occur in parallel, occur multiple times, or occur in a different order.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for verifying data integrity of a block device, the method comprising: providing a secure world execution environment configured to monitor changes to data blocks of a block device; determining whether a secure marker is present, wherein a presence of the secure marker indicates that the block device is valid or verified, and wherein the secure marker comprises a securely stored and encrypted file within a security architecture; and in response to a determination that the secure marker is not present, within the secure world execution environment, generating a hash for changed data blocks of the block device, and generating a cryptographic signature and verifying the cryptographic signature.

2. The method as set forth in claim 1, wherein the secure world execution environment is an isolated and secure mode entered from a trusted boot process.

3. The method as set forth in claim 1, wherein the hash is generated for a data block that has been updated by a file-based update applied to the block device.

4. The method as set forth in claim 3, wherein the file-based update comprises a flash type update.

5. The method as set forth in claim 3, wherein the file-based update comprises a remote update.

6. The method as set forth in claim 3, further comprising: within the secure world execution environment, generating a root hash for a hash tree of the block device after the file-based update is completed.

7. The method as set forth in claim 6, further comprising: providing a secure method to generate the cryptographic signature of the root hash on the block device at an end of an update process using a cryptographic key within the secure world execution environment; and providing a secure method to verify the cryptographic signature of the root hash on the block device at a beginning of the update process using the cryptographic key within the secure world execution environment.

8. The method as set forth in claim 7, further comprising: providing a secure storage comprising the cryptographic key and a certificate for the cryptographic signature generation and verification, within the secure world execution environment.

9. The method as set forth in claim 8, further comprising: within a normal world execution environment, verifying the cryptographic signature generated on the block device for the root hash.

10. The method as set forth in claim 1, further comprising in response a determination that the secure marker is present: applying an update to a secure partition; and regenerating a hash based on an entire content of the block device.

11. A user equipment, comprising: a memory configured to store data; and verification processing circuitry (VPC) configured to: monitor, in a secure world execution environment, changes to data blocks of a block device of the user equipment; determine whether a secure marker is present, wherein a presence of the secure marker indicates that the block device is valid or verified, and wherein the secure marker comprises a securely stored and encrypted file within a security architecture; and in response to a determination that the secure marker is not present, in the secure world execution environment; generate a hash associated with a changed data block of the block device, and generate a signature and verifying the signature for the hash of the data blocks of the block device, wherein the signature for the hash of the data blocks of the block device is verified in a normal world execution environment.

12. The user equipment as set forth in claim 11, wherein the secure world execution environment is an isolated and secure mode entered from a trusted boot process.

13. The user equipment as set forth in claim 11, wherein the hash is generated for a data block that has been updated by a file-based update applied to the block device.

14. The user equipment as set forth in claim 13, wherein the file-based update comprises a flash type update.

15. The user equipment as set forth in claim 13, wherein the file-based update comprises a remote update.

16. The user equipment as set forth in claim 13, wherein the VPC is configured to generate a root hash for a hash tree of the block device.

17. The user equipment as set forth in claim 16, the memory further comprising: a secure storage comprising a cryptographic key, wherein the secure storage is configured to communicate the cryptographic key to only the secure world execution environment.

18. The user equipment as set forth in claim 17, wherein, the VPC is configured to cryptographically sign the root hash using the cryptographic key in the secure world environment.

19. The user equipment as set forth in claim 12, wherein the VPC is further configured to: verify the signature of the hash in the trusted boot process; and setup a block data integrity tool after verifying the signature of the hash in the trusted boot process.

20. A method for verifying data integrity of a block device of a user equipment, the method comprising: receiving a file-based update package; determining whether a secure marker is present, wherein a presence of the secure marker indicates that the block device is valid or verified, and wherein the secure marker comprises a securely stored and encrypted file within a security architecture; and in response to a determination that the secure marker is present: applying the file-based update package to the block device of a secure partition; generating a root hash associated with at least one updated data block of the block device.

21. The method as set forth in claim 20, wherein the generating the root hash is accomplished in a secure world execution environment of the user equipment.

22. The method as set forth in claim 21, further comprising: cryptographically signing the root hash using a cryptographic key.

23. The method as set forth in claim 22, wherein the cryptographic key is stored in a secure storage of the user equipment and the secure storage is configured to communicate the cryptographic key to only the secure world execution environment.

24. The method as set forth in claim 22, further comprising: within a normal world execution environment, verifying the signature of the root hash in a trusted boot process; and setting up a block data integrity tool after verifying the signature of the root hash in the trusted boot process.

* * * * *